(12) United States Patent
Lötter et al.

(10) Patent No.: US 7,548,580 B2
(45) Date of Patent: *Jun. 16, 2009

(54) ADAPTIVE PILOT INTERFERENCE CANCELLATION IN CDMA SYSTEMS

(75) Inventors: Michiel Lötter, San Diego, CA (US); Danie van Wyk, Gauteng (ZA)

(73) Assignee: Broadcom Corporation, Irvine, CA (US)

( * ) Notice: Subject to any disclaimer, the term of this patent is extended or adjusted under 35 U.S.C. 154(b) by 504 days.

This patent is subject to a terminal disclaimer.

(21) Appl. No.: 11/452,840

(22) Filed: Jun. 14, 2006

(65) Prior Publication Data

US 2006/0233224 A1 Oct. 19, 2006

Related U.S. Application Data

(63) Continuation of application No. 10/649,335, filed on Aug. 26, 2003, now Pat. No. 7,103,094.

(60) Provisional application No. 60/407,363, filed on Aug. 29, 2002.

(51) Int. Cl.
*H04B 1/707* (2006.01)
(52) U.S. Cl. .................................. 375/148
(58) Field of Classification Search ............ 375/144, 375/148, 260; 370/320, 335, 342
See application file for complete search history.

(56) References Cited

U.S. PATENT DOCUMENTS

| | | | |
|---|---|---|---|
| 6,034,986 A | 3/2000 | Yellin | |
| 6,067,292 A | 5/2000 | Huang et al. | |
| 6,570,909 B1 | 5/2003 | Kansakoski et al. | |
| 6,580,771 B2 | 6/2003 | Kenney | |
| 6,680,727 B2 | 1/2004 | Butler et al. | |
| 6,718,162 B1 | 4/2004 | Agin et al. | |
| 6,865,218 B1 * | 3/2005 | Sourour | 375/148 |
| 6,882,681 B2 | 4/2005 | Sano | |
| 2002/0131390 A1 | 9/2002 | Kuo et al. | |
| 2004/0028121 A1 | 2/2004 | Fitton | |

OTHER PUBLICATIONS

Proakis John G., "Digital Communications", 3$^{rd}$ Edition, 1995, pp. 797-805, McGraw-Hill Series in Electrical and Computer Engineering, ISBN 0-07-051726-6, USA.
Turin George L., "Introduction to Spread-Spectrum Antimultipath Techniques and Their Application to Urban Digital Radio", Proceedings of the IEEE, vol. 68 No. 3, Mar. 1980, pp. 328-353, USA.
Third Generation Partnership Project: Technical Specification Group Radio Access Network; Feasibility Study on the Mitigation of the Effect of the Common Pilot Channel (CPICH) Interference; 3GPP TR 25.991; V5.1.0; Dec. 2002; 28 pgs.

* cited by examiner

*Primary Examiner*—Young T. Tse
(74) *Attorney, Agent, or Firm*—McAndrews, Held & Malloy, Ltd.

(57) ABSTRACT

A system and method for interference reduction in a spread spectrum receiver including a rake receiver having a plurality of fingers for processing a plurality of data signals and an associated plurality of pilot signals is disclosed herein. The method includes generating a plurality of intra-finger interference cancellation signals using the plurality of pilot signals. In this regard each of the plurality of intra-finger interference cancellation signals are associated with one of the plurality of fingers. Ones of the plurality of intra-finger interference cancellation signals are weighted so as to generate a set of weighted intra-finger interference cancellation signals. The method further includes synthesizing at least one interfinger interference cancellation signal in accordance with the set of weighted intra-finger cancellation signals. At least one inter-finger cancellation signal may then be subtracted from a corresponding one of a plurality of data signals.

23 Claims, 9 Drawing Sheets

ADAPTIVE PILOT INTERFERENCE CANCELLATION IN CDMA SYSTEMS

CROSS-REFERENCE TO RELATED APPLICATIONS

The present application is a continuation of U.S. patent application Ser. No. 10/649,335, filed Aug. 26, 2003, now U.S. Pat. No. 7,103,094 B2. Said U.S. patent application Ser. No. 10/649,335 claims benefit from and priority to U.S. Provisional Application No. 60/407,363, filed Aug. 29, 2002.

FIELD OF THE INVENTION

The present invention relates to Code Division Multiple Access (CDMA) communication systems and, in particular, to a technique for canceling pilot signal interference within such systems.

BACKGROUND OF THE INVENTION

Recently, various forms of Code-Division Multiple Access (CDMA) wireless communication systems have become standardized and deployed in a number of countries. More specifically, such standards include IS-95, cdma2000 and WCDMA. In CDMA systems, users are distinguished from each other by being assigned different code sequences.

Within CDMA systems, a "pilot" signal is often transmitted by a transmitter in order to facilitate the performance of a number of operations at a receiver. For example, the pilot signal may be utilized by the receiver to establish timing and frequency synchronization with the transmitter, to estimate channel characteristics, and to facilitate coherent demodulation of transmitted data. Each pilot signal is typically uniquely associated with a particular base station in order to enable a mobile station to identify the base station from which a pilot signal is received. This association may be achieved by assigning each base station a different offset to employ when generating its PN sequence. Generation of a pilot signal is typically effected by "covering" a known data pattern with a known Walsh code and spreading the result with a known pseudo-noise (PN) sequence.

Rake receivers operative to implement diversity reception techniques are often deployed within CDMA systems to extract pilot, user traffic and other data from signal energy received over a channel. Each "finger" or diversity branch of the Rake receiver processes its assigned multipath component and recovers the associated pilot signal, user traffic and other data. Recovered pilot signal information is generally used to estimate the characteristics of the channel (e.g., amplitude and phase) needed for coherent detection within the Rake receiver. Typically, the pilot signal is generated so as to be orthogonal to the spreading codes assigned to system users so as not to engender interference during the data demodulation process. However, in the case of dispersive multipath channels, the various received multipath signal components will be mutually non-orthogonal and will hence create undesirable interference. Since the contribution of the pilot signal to the transmitted signal is generally somewhat substantial, multipath interference arising from non-orthogonal pilot components can degrade receiver performance.

Accordingly, a need exists for a technique for canceling multipath pilot signal interference within diversity receivers.

SUMMARY OF THE INVENTION

In summary, the present invention relates in one aspect to a method of interference reduction in a spread spectrum receiver including a rake receiver having a plurality of fingers for processing a plurality of data signals and an associated plurality of pilot signals. The method includes generating a plurality of intra-finger interference cancellation signals using the plurality of pilot signals. In this regard each of the plurality of intra-finger interference cancellation signals are associated with one of the plurality of fingers. Ones of the plurality of intra-finger interference cancellation signals are weighted so as to generate a set of weighted intra-finger interference cancellation signals. The inventive method further includes synthesizing at least one inter-finger interference cancellation signal in accordance with the set of weighted intra-finger cancellation signals. At least one inter-finger cancellation signal may then be subtracted from a corresponding one of the plurality of data signals.

In another aspect, the present invention is directed to a method of interference reduction in a spread spectrum receiver including a rake receiver having N fingers for processing N data signals and N associated pilot signals. The method includes generating N intra-finger interference cancellation signals using the N associated pilot signals. In this regard each of the N intra-finger interference cancellation signals are associated with one of the N fingers. Ones of the N intra-finger interference cancellation signals are weighted so as to generate N weighted intra-finger interference cancellation signals. The method further includes synthesizing N inter-finger interference cancellation signals. Each of the N inter-finger cancellation signals is synthesized on the basis of one or more of the N weighted intra-finger interference cancellation signals. In addition, each of the N inter-finger interference cancellation signals are subtracted from a corresponding one of the N data signals, thereby generating N interference-reduced data signals.

In another aspect, the present invention relates to a spread spectrum receiver incorporating a rake receiver having N fingers for processing N data signals and N associated pilot signals. Each of the N fingers includes an intra-finger interference cancellation module configured to generate an intra-finger interference cancellation signal using at least one of the N associated pilot signals. The receiver further includes an inter-finger interference cancellation module for synthesizing N inter-finger interference cancellation signals, each of the N inter-finger cancellation signals being synthesized on the basis of a set of the intra-finger interference cancellation signals. The inter-finger interference cancellation module includes: (i) a gain adjustment unit for weighting the intra-finger cancellation signals so as to generate a plurality of weighted intra-finger cancellation signals, and (ii) a summation unit adapted to combine ones of the plurality of weighted intra-finger cancellation signals.

BRIEF DESCRIPTION OF THE DRAWINGS

For a better understanding of the nature of the features of the invention, reference should be made to the following detailed description taken in conjunction with the accompanying drawings, in which.

DETAILED DESCRIPTION OF THE INVENTION

The present invention is directed to a system and method for adaptively canceling interference within a received CDMA signal arising from the presence of pilot signal energy associated with its various multipath components. In the context of a WCDMA system, the present invention may be employed to effect adaptive cancellation of known Common Pilot Channels (CPICHs) present within the various multipath components of a received signal. The adaptive interference cancellation (AIC) process described herein may advantageously be implemented within minimal complexity. Moreover, the information content and structure of the pilot channels to be cancelled are known a priori by user equipment. This enables implementation to be simplified relative to more complex approaches used for data channel interference mitigation.

A received CDMA signal generally is comprised of a number of multipath components, each of which is typically separately processed by an associated "finger" of a CDMA receiver. From the perspective of a given multipath component, the multipath components processed by other receiver fingers constitute undesirable signal interference. In accordance with the invention, the channels associated with the pilot signals of each interfering multipath component are estimated and corresponding channel models produced. A number of intra-finger pilot interference cancellation signals are then created by regenerating the pilot signals associated with each interfering multipath component and passing the regenerated pilot signals through these channel models. A composite inter-finger interference cancellation signal is then synthesized on the basis of these intra-finger pilot interference cancellation signals. The inter-finger interference cancellation signal is then subtracted from the digitized baseband signal processed by a given receiver finger in order to produce a "cleaned" signal from which undesirable pilot signal information has been substantially removed. An interference cancellation verification mechanism may also be employed in order to enable implementation of an adaptive interference cancellation strategy designed to mitigate the adverse consequences of any potential cancellation inaccuracy.

Figure 1:
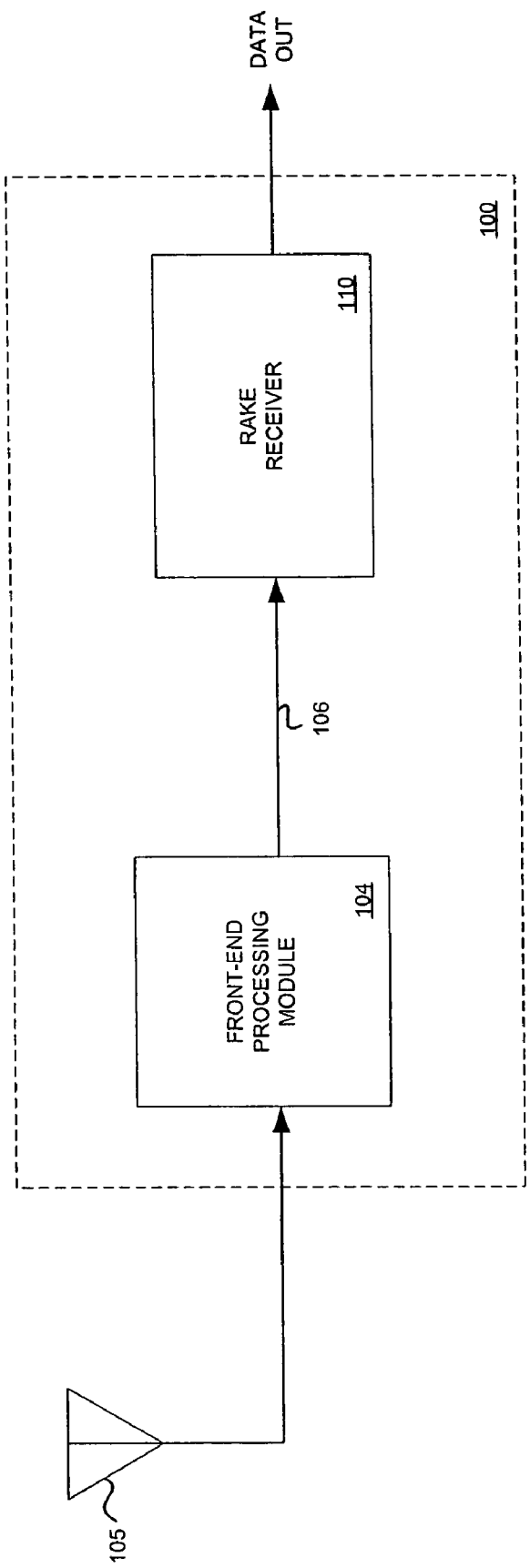
FIG. 1 is a block diagram of a conventional mobile unit receiver, within which may be implemented the adaptive pilot interference cancellation technique of the present invention.

FIG. 1 is a block diagram is provided of a conventional mobile unit receiver 100, within which may be implemented the adaptive pilot interference cancellation technique of the present invention. The mobile unit receiver 100 is presumed to be disposed within a mobile unit configured to operate within a CDMA communication system. The mobile unit receiver 100 includes a front-end processing module 104 which receives forward link signal components collected by an antenna 105. The forward link signal components arise upon transmission by a transmitter (not shown) of a CDMA communication signal though a multipath propagation environment to the mobile unit. Typically, a CDMA forward link transmitter is configured to transmit a multi-channel. signal to a plurality of user stations. Specifically, the transmitter sends a Walsh pilot signal along with the plurality of data signals to the mobile units. Each of the plurality of data channels are encoded using a different Walsh code which is orthogonal to the Walsh code of other data channels and to the Walsh code of the pilot signal.

Referring again to FIG. 1, the front-end processing module 104 filters, amplifies, downconverts and digitizes the received forward link signal in order to create a set of received data samples 106 provided to a Rake receiver module 110. In operation, the Rake receiver module 110 functions to generate recovered symbols on the basis of the data samples 106 provided by the front-end processing module 104.

The Rake receiver module 110 is configured to process the multiple components of the received signal arriving via different signal paths, or "multipaths". As is known in the art, a Rake receiver provides an optimum structure for receiving signals in a multipath environment in the presence of minimal or no interference from other users. The principles of Rake receivers are well described in the art. See, e.g., "Introduction to Spread Spectrum Anti-multipath Technique and Their Applications to Urban Digital Radio" by G. L. Turin; Proceedings IEEE, Vol. 65, No. 3, Pages 328-353 March, 1980, and "Digital Communications" by J. G. Proakis; McGraw-Hill, 1989.

Figure 2:
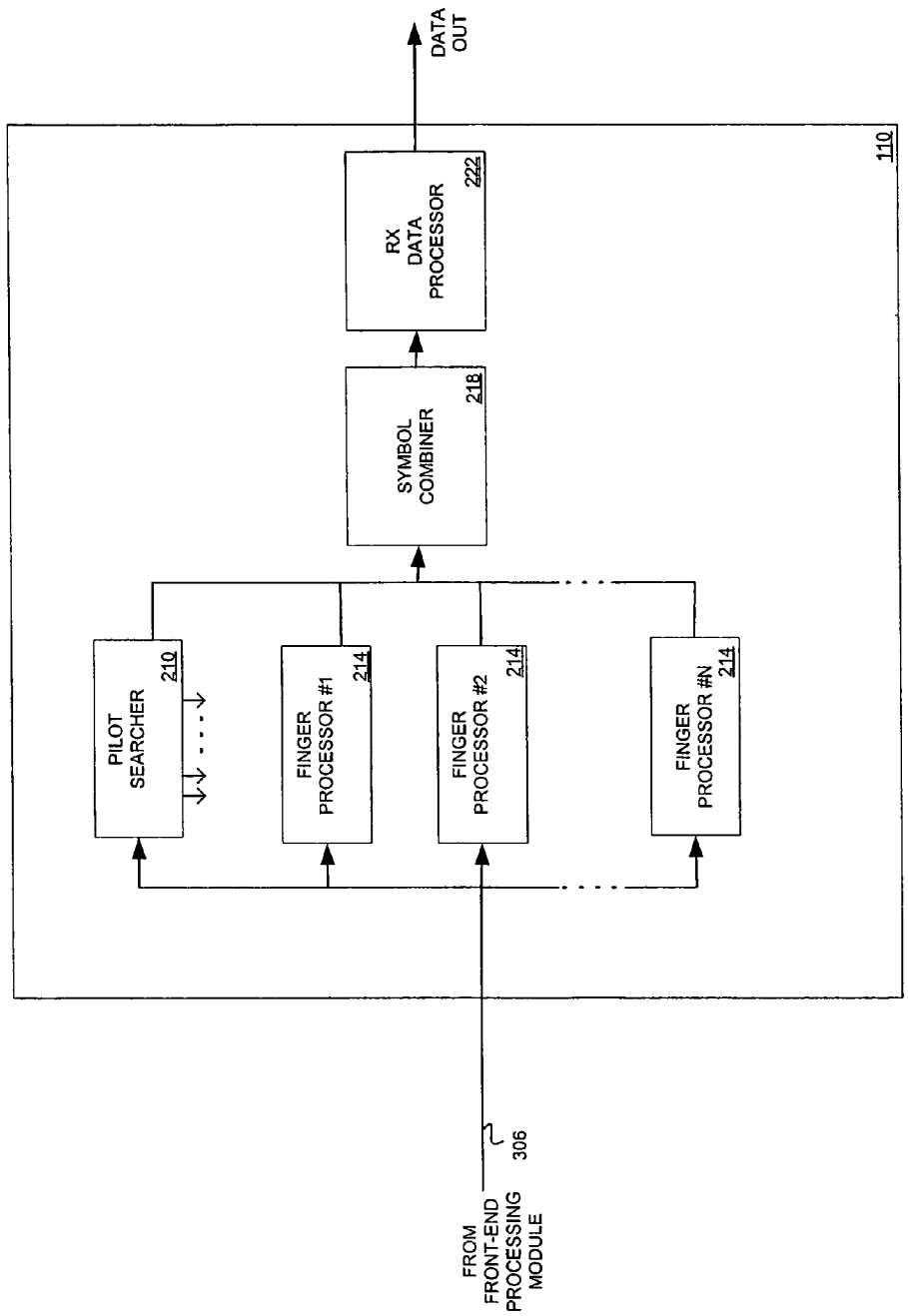
FIG. 2 is a block diagram of conventional a Rake receiver module incorporated within the mobile unit receiver of FIG. 1.

Referring now to FIG. 2, a block diagram is provided of a conventional Rake receiver module 110. The Rake receiver module 110 includes a number of diversity processing paths 214, or "finger" processors 214, each of which digitally process the data samples 106 corresponding to an instance of the forward link signal received over one such signal path. Each finger processor 214 processes a particular multipath component of the received signal. Such processing includes despreading the data samples 106 using a particular user's PN sequence in time alignment with the multipath signal being processed by the applicable finger processor 214. The resultant candidate symbol streams from the finger processors 214 are provided to a diversity combiner module 218, which synthesizes a single composite symbol stream on the basis of these candidate streams. A receive (RX) data processor 222 then receives and decodes the composite symbol stream from the diversity combiner module 218 in order to recover the user data and message information transmitted on the forward link.

As mentioned above, each of the finger processors 214 are used to demodulate and otherwise process an instance of the forward link signal received over a different air path of the multipath propagation environment. Each finger processor 214 is of substantially identical structure, but operates on the basis of different parameters characteristic of its associated air path (e.g., gain, phase and time delay). The Rake receiver module 110 further includes a pilot searcher 210 for detecting various multipath components of the pilot signal being received. This searching is effected using known techniques to correlate the received signal with a PN sequence associated with the pilot signal, thereby detecting the signals transmitted by different base stations and the multi-path components thereof. The pilot searcher 210 provides the detected offsets in the PN signal associated with each multipath component to a finger processor 214 assigned to process such multipath component. The phase reference provided by the detected pilot signals enables each finger processor 214 to perform a coherent demodulation of a given path of the incident multipath-distorted signal.

Various conventional aspects of the structure and operation of a Rake receiver have now been described. Attention is now directed to a description of an exemplary implementation of an adaptive pilot interference cancellation process of the present invention.

Figure 3:
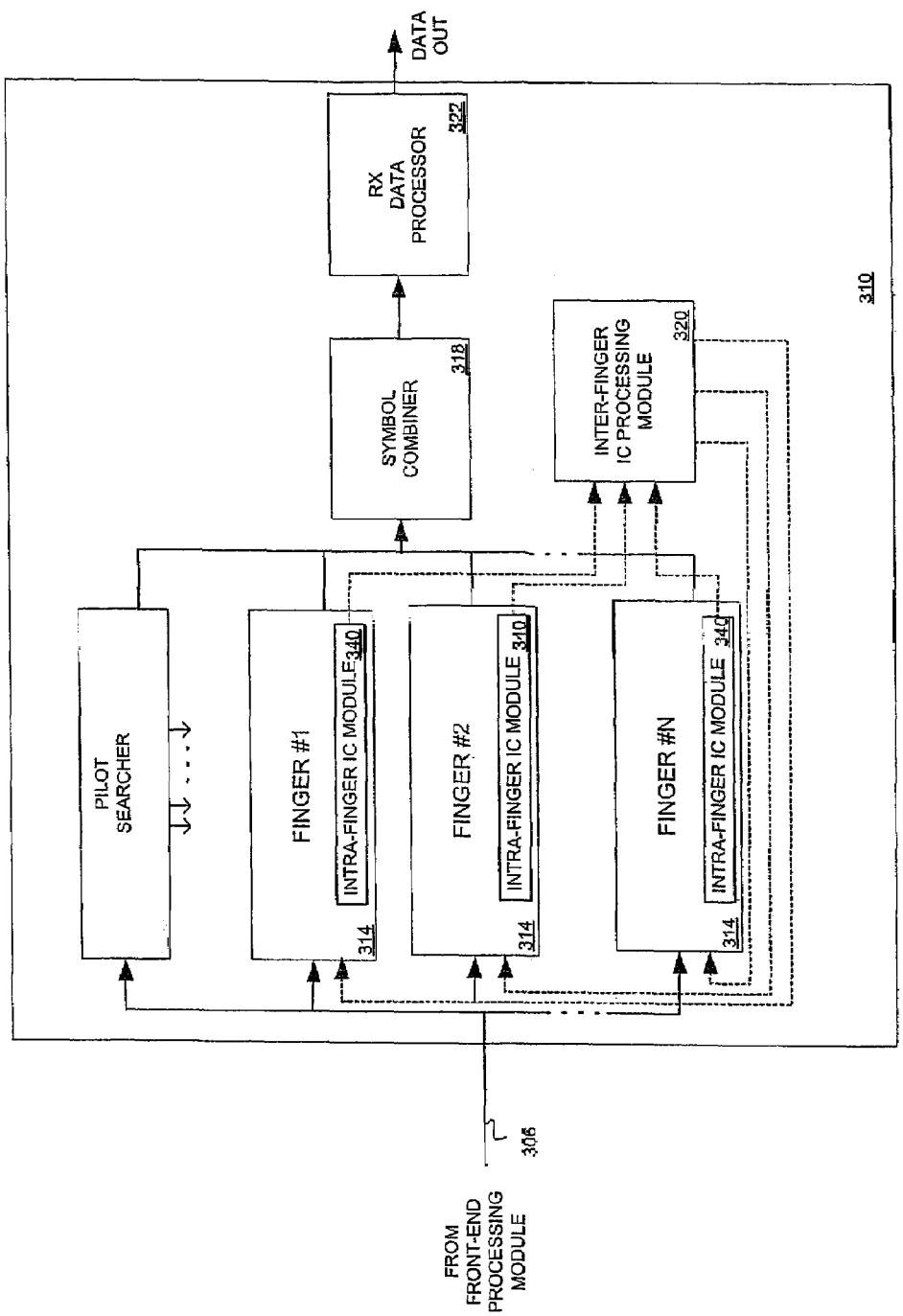
FIG. 3 is a block diagram of a Rake receiver module implemented in accordance with the present invention.

Turning to FIG. 3, there is shown a block diagram of a Rake receiver module 310 of the present invention. The Rake receiver module 310 includes a number of finger processors 314, each of which digitally process data samples 306 corresponding to an instance of a forward link signal received from a base station (not shown) over a particular signal path. Each finger processor 314 processes a particular multipath component of the received signal. Such processing includes despreading the data samples 306 using a PN sequence in time alignment with the multipath signal being processed by the applicable finger processor 314. The resultant candidate symbol streams from the finger processors 314 are provided to a diversity combiner module 318, which synthesizes a single composite symbol stream on the basis of these candidate streams. A receive (RX) data processor 322 then receives and decodes the composite symbol stream from the diversity combiner module 318 in order to recover the user data and message information transmitted on the forward link. Except with regard to execution of the inventive interference cancellation process described below, the Rake receiver module 310 operates substantially similarly to the conventional Rake receiver module 110.

In accordance with one aspect of the invention, each finger processor 314 includes an intra-finger interference cancellation (IC) module 340 configured to generate an intra-finger interference cancellation (IC) signal on the basis of the pilot signal component processed by such finger processor 314. In addition, the Rake receiver module 310 further includes an inter-finger interference cancellation module 320 operative to produce inter-finger interference cancellation (IC) signals on the basis of the plurality of intra finger IC signals received from the finger processors 314. Each inter-finger IC signal is applied with the appropriate timing synchronization to the applicable finger processor 314, which subtracts the inter-finger IC signal from the baseband data samples 306 of the received "dirty" or interference-laden signal to be processed by the finger processor 314. This results in generation of an interference-reduced baseband signal substantially devoid of pilot signal energy associated with any of the receiver finger processors 314.

Figure 4:
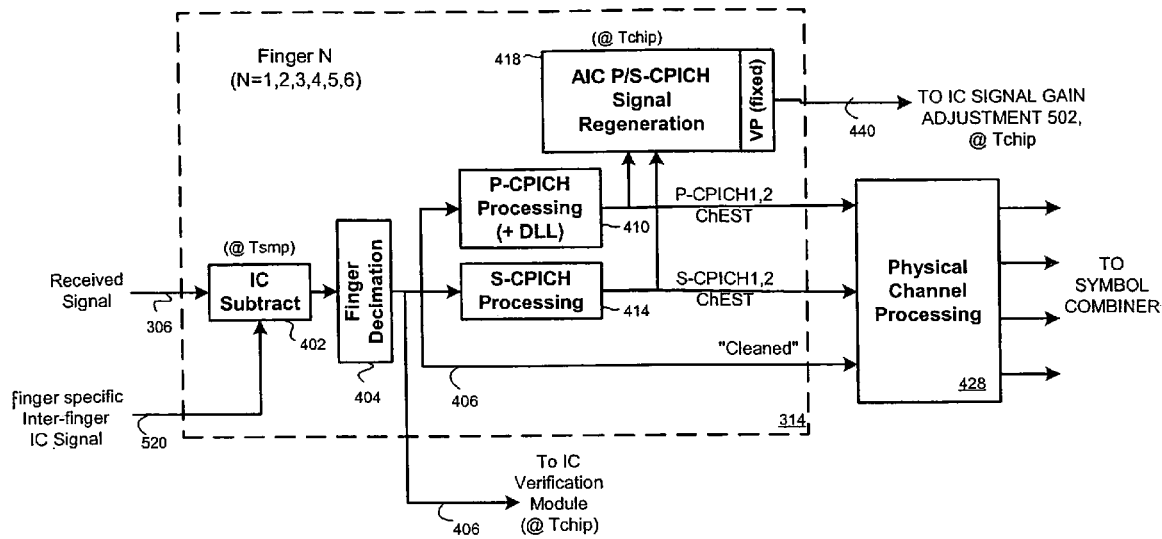
FIG. 4 provides a high-level block diagram of an intra-finger interference cancellation module of the type disposed within each finger processor of the Rake receiver of FIG. 3.

FIG. 4 provides a high-level block diagram of the intra-finger interference cancellation module 340 disposed within each finger processor 314. In the embodiment of FIG. 4,. the finger processing module 340 is configured for implementation within WCDMA systems, which are known to operate using a primary (P) and secondary (S) pilot signals. Accordingly, each finger processor 314 will experience interference arising from primary and secondary common pilot channel energy (CPICH) within the signal processed by each finger processor 314. That is, the different multipath components of the primary and secondary pilot signals respectively processed by different ones of the finger processors 314 tend to be commonly present within the received signal distributed to all finger processors 314. As is described herein, each intra-finger IC module 340 generates a P-CPICH intra-finger IC signal and an S-CPICH intra-finger IC signal on the basis of the primary and secondary pilot signal multipath components assigned by the pilot searcher 310 to be processed by the applicable finger processor 314.

As shown in FIG. 4, the received baseband data samples 306 are provided to an IC subtraction module 402 which cooperates with a finger decimation module 404 to produce a "cleaned" decimated sample stream 406. Specifically, the IC subtraction module 402 operates to subtract the applicable inter-finger IC signal 520 generated by the inter-finger interference cancellation module 320 from the data samples 306. Following decimation within module 404, the resultant sample stream comprises the "cleaned" decimated data samples 406 used by various components of the intra-finger IC module 340 and finger processor 314. As shown, the decimated sample stream 406 is provided to a P-CPICH processing module 410 and an S-CPICH processing module 414 within the intra-finger IC module 340. As is described below, the P-CPICH processing module 410 and the S-CPICH processing module 414 produce estimated models of the received primary and secondary pilot channels, respectively. When transmit diversity is employed, a pair of primary pilot signals and a pair of secondary pilot signals are received at a mobile unit receiver incorporating the inventive Rake receiver 310. In this case first and second estimated primary pilot channel models (P-CPICH1,2 CHEST) and first and second estimated secondary pilot channel models (S-CPICH1,2 ChEST) are respectively produced by the P-CPICH processing module 410 and the S-CPICH processing module 414. The P-CPICH1,2 ChEST and S-CPICH1,2 ChEST signals are provided to an AIC PS/CPICH signal regeneration module 418 and to a physical channel processing module 428. As shown, the AIC PS/CPICH signal regeneration module 418 produces an intra-finger IC signal 440 on the basis of the P-CPICH1,2 CHEST model signals and the S-CPICH1,2 CHEST model signals. More particularly, in the exemplary embodiment both a P-CPICH intra-finger IC signal and an S-CPICH intra-finger IC signal are produced and then combined within the AIC PS/CPICH signal regeneration module 418 in order to yield the intra-finger IC signal 440.

Figure 11:
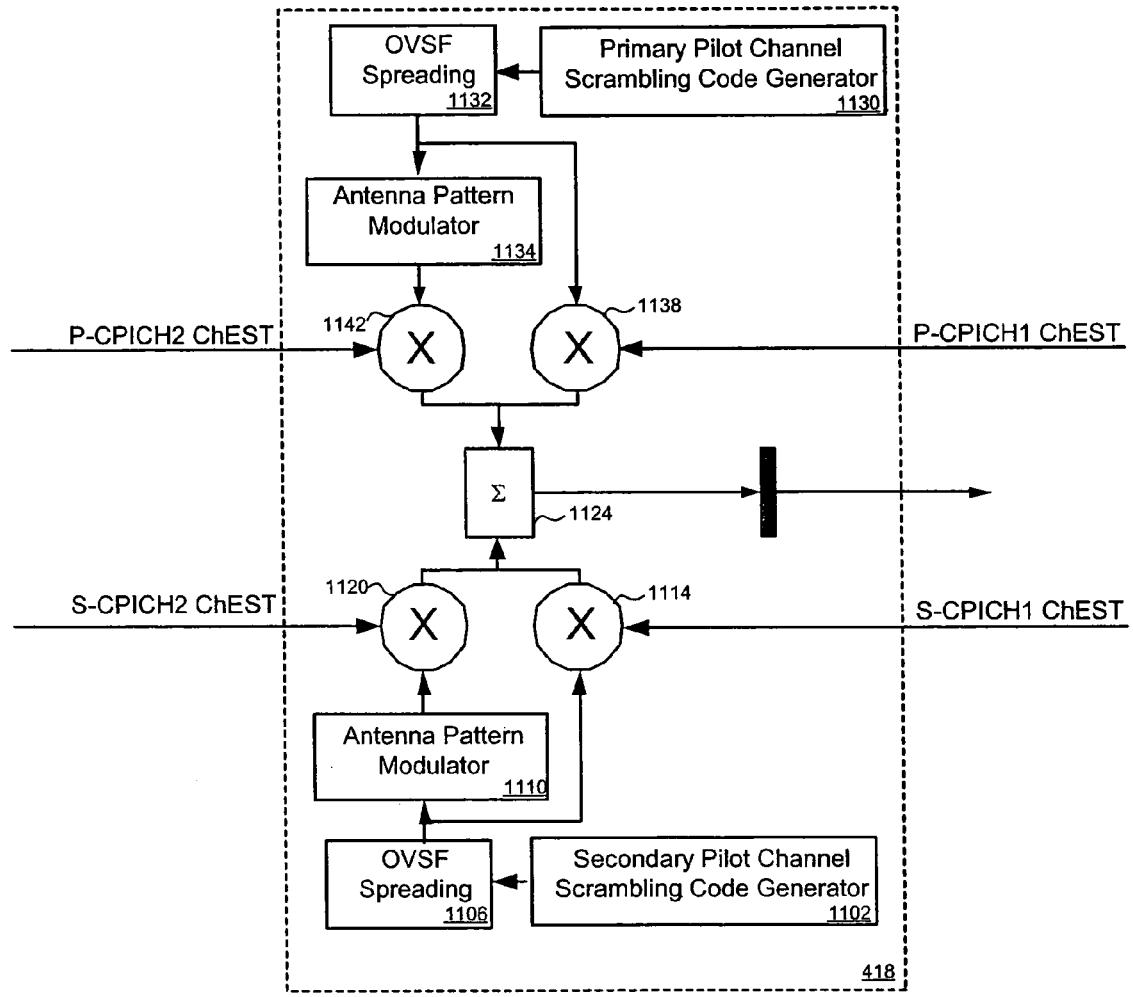
FIG. 11 is a block diagrammatic representation of a particular implementation of an AIC PS/CPICH signal regeneration module.

FIG. 11 is a block diagrammatic representation of a particular implementation of the AIC PS/CPICH signal regeneration module 418. As shown, the module 418 includes a secondary pilot channel OVSF code generator 1106 disposed to produce an OVSF sequence corresponding to the secondary pilot channel. This OVSF sequence is scrambled by PN sequence 1102, which distinguishes the secondary pilot channel from user channels and the primary pilot channel. The scrambled output of the OVSF module 1106 is provided to an antenna pattern modulator 1110 as well as to a secondary pilot channel multiplier 1114. The antenna pattern modulator 1110 adds an additional modulation pattern to the S-CPICH channel in order to simulate the transmission of the S-CPICH signal from a base station (not shown) having two antennas. The output of the modulator 1110 is connected to a secondary pilot channel multiplier 1120, which is also provided with the S-CPICH2 ChEST model signal. Similarly, the secondary pilot channel multiplier 1114 is provided with the S-CPICH1 CHEST model signal. The S-CPICH2 ChEST and S-CPICH1 CHEST model signals are each derived on the basis of transmissions from one of two antennas disposed at a remote base station (not shown). The results of the multiplications effected by the secondary pilot channel multipliers 1114, 1120 are provided to summer 1124.

As is indicated by FIG. 11, the module 418 also includes a primary pilot channel scrambling code generator 1130 disposed to produce a PN sequence corresponding to the primary pilot channel. This PN sequence is spread by an OVSF module 1132, which distinguishes the primary pilot channel from user channels and the secondary pilot channel. The output of the OVSF module 1132 is provided to an antenna pattern modulator 1134 as well as to a primary pilot channel multiplier 1138. The antenna pattern modulator 1134 adds an additional modulation pattern to the P-CPICH channel in order to simulate the transmission of the P-CPICH signal from a base station (not shown) having two antennas. The output of the modulator 1134 is connected to a primary pilot channel multiplier 11142, which is also provided with the P-CPICH2 CHEST model signal. Similarly, the primary pilot channel multiplier 1138 is provided with the P-CPICH1 ChEST model signal. The P-CPICH2 ChEST and P-CPICH1 CHEST model signals are each derived on the basis of transmissions from one of two antennas disposed at a remote base station (not shown). The results of the multiplications effected by the primary pilot channel multipliers 1138, 1142 are provided to summer 1124. As shown, summer 1124 produces the intra-finger IC signal 440 by combining the signals produced by the primary pilot channel multipliers 1138, 1142 and the secondary pilot channel multipliers 1114, 1120.

Figure 5:
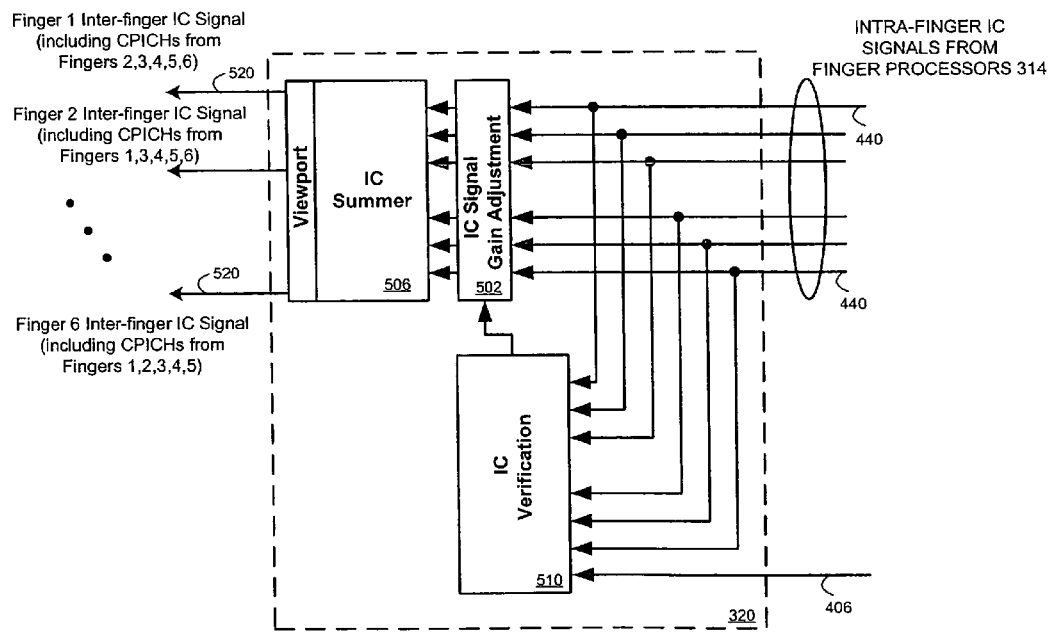
FIG. 5 is a high-level block diagram of an inter-finger interference cancellation module incorporated within the Rake receiver of FIG. 3.

Turning now to FIG. 5, a high-level block diagram is provided of the inter-finger interference cancellation module 320. As shown, the intra-finger IC signals 440 produced by the intra-finger IC module 340 of each finger processor 314 are provided to an IC signal gain adjustment unit 502 of the inter-finger interference cancellation module 320. As is discussed below, the inter-finger IC signal 520 produced by the module 320 for a given finger processor 314 is generated by an IC summer 506 by combining a set of the intra-finger IC signals 440 previously weighted by the IC signal gain adjustment unit 502. The intra-finger IC signals 440 are also provided to a IC verification module 510 configured to verify the extent to which undesired pilot channel content associated with other finger processors 314 has been removed from the "cleaned" decimated data samples 406 of a given finger processor 314. In the exemplary embodiment the IC verification module 510 does not continuously operate upon each intra-finger IC signal 440, but instead successively processes these signals in a "round-robin" manner.

Figure 6:
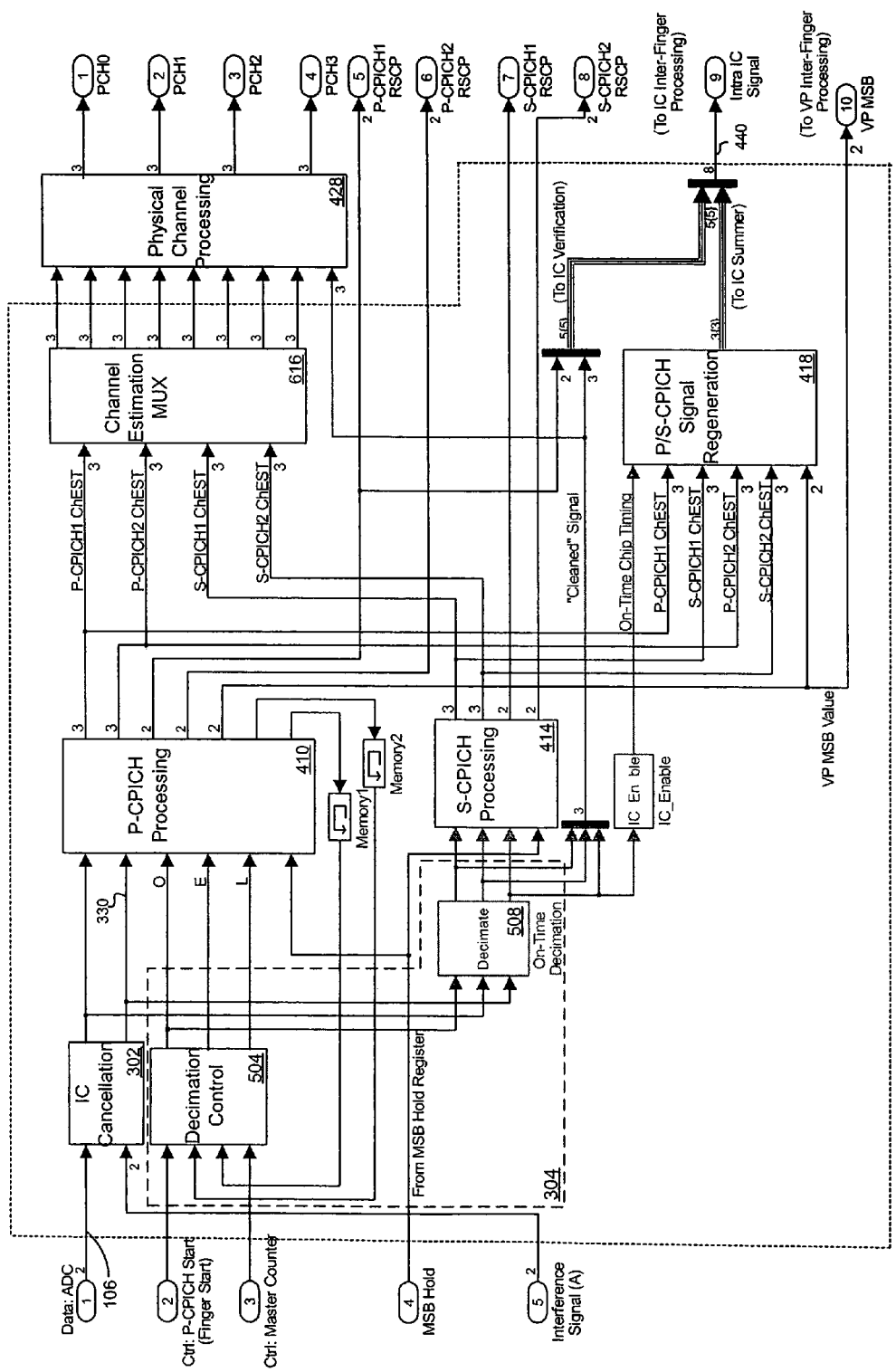
FIG. 6 provides a more detailed representation of an intra-finger interference cancellation module.

FIG. 6 provides a more detailed representation of the intra-finger IC module 340. As shown, the finger decimation module 404 includes a decimation control block 604 and an on-time decimation module 608. During operation, the decimated sample stream generated by the finger decimation module 404 is provided to the P-CPICH processing module 410 and the S-CPICH processing module 414. The processing modules 410 and 414 respectively detect the P and S pilot channel components present in the decimated sample stream (at one sample per chip) and produce channel estimates of the air interfaces over which the respective P and S pilot channel components were received. In particular, channel estimation may be performed by the P-CPICH processing module 410 by passing the decimated sample stream through a filter matched to the waveform of the P pilot signal. Similarly, the S-CPICH processing module 414 performs channel estimation by passing the decimated sample stream through a filter matched to the waveform of the S pilot signal. By comparing the filtered pilot signals to known replicas of the P and S pilot signals, the processing modules 410 and 414 respectively estimate the amplitude, and phase of the P and S pilot channels and generate corresponding channel models. As shown, the channel estimates produced by the. processing modules 410 and 414 are provided to a channel estimation multiplexer 616.

Using the channel models produced by the processing modules 410 and 414 (i.e., P-CPICH1,2 ChEST and S-CPICH1,2 ChEST), the AIC PS/CPICH signal regeneration module 418 produces the applicable intra-finger IC signal 440 by regenerating the pilot channel components processed by the applicable finger processor 314. In particular, replicas of the known P and S pilot signals are each passed through the appropriate channel model in order to form P and S regenerated pilot signal components of the applicable intra-finger IC signal. In the exemplary embodiment the AIC PS/CPICH signal regeneration module 418 contains transmitter components (e.g., spreading and scrambling modules) capable of generating such known P and S pilot signals.

Figure 7:
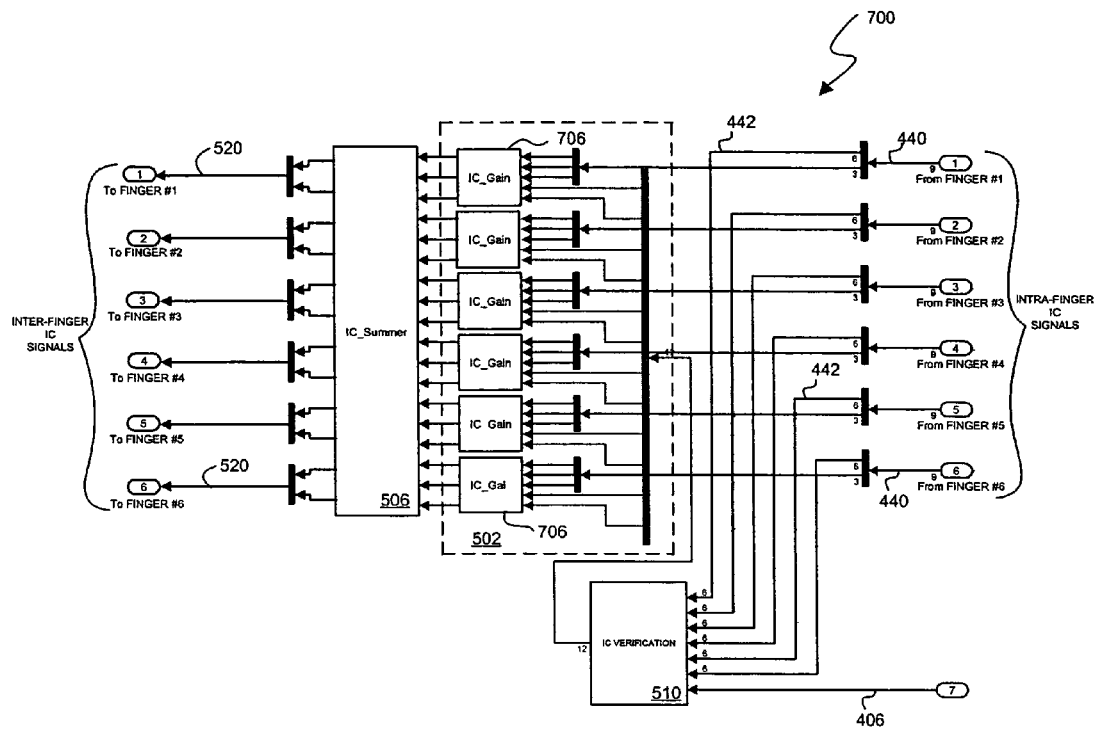
FIG. 7 is a partially schematic representation of a signal gain adjustment and summation sub-system of the inter-finger interference cancellation module of FIG. 5.

Referring now to FIG. 7, a partially schematic representation is provided of a signal gain adjustment and summation sub-system 700 of the inter-finger interference cancellation module 340. The sub-system 700 includes the IC signal gain adjustment unit 502, IC summer 506 and IC verification module 510. As shown, the signal gain adjustment unit 502 includes a plurality of IC_Gain elements 706 for adjusting the gain of the intra-finger IC signals 440 in accordance with a predefined amplitude weighting function. In the exemplary embodiment the amplitude weighting function assigns weights to each intra-finger IC signal 440 on the basis of the confidence in such signal as determined by the IC verification module 510. The IC verification module 510 assigns a "confidence" value to the intra-finger IC signal 440 of a given finger processor 314 based upon the extent to which it lacks undesired pilot signal energy associated with other such finger processors 314. The following gain settings for the IC-Gain elements 706 will preferably be available based upon the confidence values determined by the IC verification module 510: 0, 1, 2, 4, 8, 16. The '0' gain setting indicates that the applicable intra-finger IC signal 440 should be excluded from the inter-finger IC signal created by the IC summer 506. Each of the other gain settings is applied by multiplying both the I and Q components of the subject intra-finger IC signal by the assigned gain factor.

As mentioned above, the IC summer 506 performs a summation of all intra-finger IC signals 440 in order to produce a set of different inter-finger IC signals used by the finger processors 314 in canceling undesired common pilot channel interference. In the exemplary embodiment each finger processor 314 is configured to control the timing of the intra-finger IC signal 440 provided thereby to within the resolution of the sample rate. It follows that the intra-finger IC signals 440 from each finger processor 314 will arrive at the IC summer 506 at different sample instances (within one chip period). That is, the IC summer 506 needs to be designed to accommodate the sample differences among the intra-finger IC signals 440 in connection with generation of the inter-finger IC signal 520 to be distributed to all finger processors 314. To this end, the IC summer 506 takes a chip-duration "snap-shot" of all intra-finger IC signals 440, and thereby produces the inter-finger IC signal 520 corresponding to each finger processor 314 at the applicable sample rate. In the exemplary embodiment the IC summer module 506 produces a 9-bit number which is scaled down by implementing a viewport scaling function such that only the six (6) least significant bits (LSBs) are output therefrom. Once a given inter-finger IC signal 520 has been generated at the IC summer 506, it is distributed to the applicable finger processor 314 in order that pilot interference cancellation may be effected therein as described above.

Figure 8:
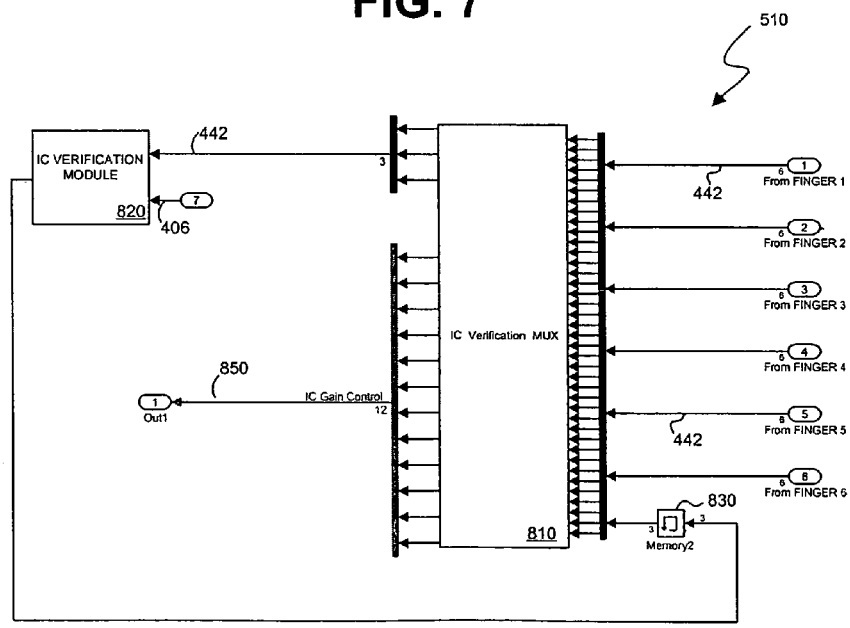
FIG. 8 is a partially schematic representation of an interference cancellation verification unit of the inter-finger interference cancellation module.

Turning to FIG. 8, a partially schematic representation is provided of the IC verification module 510. In certain embodiments, an IC verification process may be continuously performed for the intra-finger IC signal 440 of each finger processor 314. However, this generally imposes a very substantial and generally undesirable processing and implementation burden. Accordingly, in the embodiment of FIG. 8 the IC verification module 510 includes an IC verification multiplexer 810 for assigning ones of the intra-finger IC signals for verification by IC verification unit 820; more specifically, in the exemplary embodiment 6-bit intra-finger IC signal representations 442, typically comprised of the 6MSBs of the intra-finger IC signals 440, are verified via the IC verification unit 820. Once the IC verification unit 820 has completed processing of a given intra-finger IC signal 440, a circular counter 830 is incremented and a succeeding intra-finger IC signal 440 is selected for processing.

The IC verification multiplexer 810 preferably assigns ones of the intra-finger IC signals 440 for verification on a round-robin basis. That is, only one of the intra-finger IC signals 440 is assigned via multiplexer 810 to the IC verification unit 820 at any give time. These assignments are generally made on an end-of-frame boundary of the applicable finger processor 314. The IC verification multiplexer 810 also preferably calculates gain factors 850 to be associated with respective finger processors 314. These gain factors 850 are used in the verification process and are computed by comparing content of the applicable intra-finger IC signal 440 both before and after active pilot cancellation in accordance with the invention. In particular, a new gain factor is calculated once per frame (plus/minus the relative finger timing offsets) for a given finger processor 314 and applied to such finger processor 314 until completion of the next verification procedure.

Figure 9:
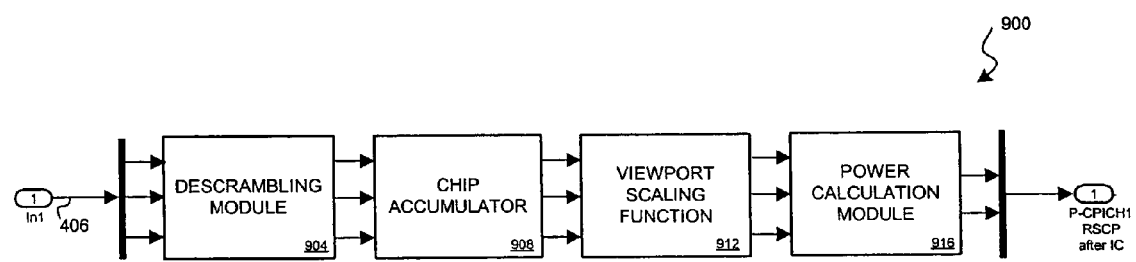
FIG. 9 provides a detailed representation of one potential implementation of the interference cancellation verification unit.

FIG. 9 provides a representation of a P-CPICH1 verification sub-system 900 incorporated within the IC verification unit 820. In the exemplary embodiment the P-CPICH1 verification sub-system 900 operates substantially identically to the on-time P-CPICH processing module 410 which, as was discussed above, is used to derive estimates of channel parameters and received power. As shown, the P-CPICH1 verification sub-system 900 includes a descrambling module 904 to which is applied the decimated output 406 of the finger processor 314. Within the descrambling module 904, the descrambling operation is applied in phase with the pilot signal that is to be verified. Following descrambling, the resultant signal is despread using the chip accumulator 904 and scaled using the viewport 912. The remaining P-CPICH signal energy to which the finger processor 314 is exposed (which provides an estimate of the undesired residual pilot energy experienced by the finger processor 314) is then calculated by the power calculation module 916.

To simplify implementation, the IC verification process effected by the verification sub-system 900 preferably only considers the P-CPICH1 signal. By using the P-CPICH1 verification sub-system 900 to execute an interference cancellation verification process with. respect to each intra-finger IC signal 440, the efficacy of the interference cancellation process of the present invention may be assessed on a finger-by-finger basis. Although in the exemplary embodiment only interference cancellation with respect to the primary pilot channel is verified, it is expected that the extent of cancellation of primary and secondary pilot channel energy will be substantially identical. The verification sub-system 900 verifies that the common pilot channel interference within a given finger processor 314 has been successfully canceled by measuring the residual signal power (RSCP) left within the cleaned signal 406 of each finger processor 314 following performance of a pilot cancellation operation consistent with the invention. In the exemplary embodiment, the magnitude of the resulting verification signal produced by the verification sub-system 900 varies inversely with the success of the pilot cancellation processing; that is, the magnitude of this verification signal decreases in response to decreases in the amount of common pilot channel interference detected to be associated with a given intra-finger IC signal.

Figure 10:
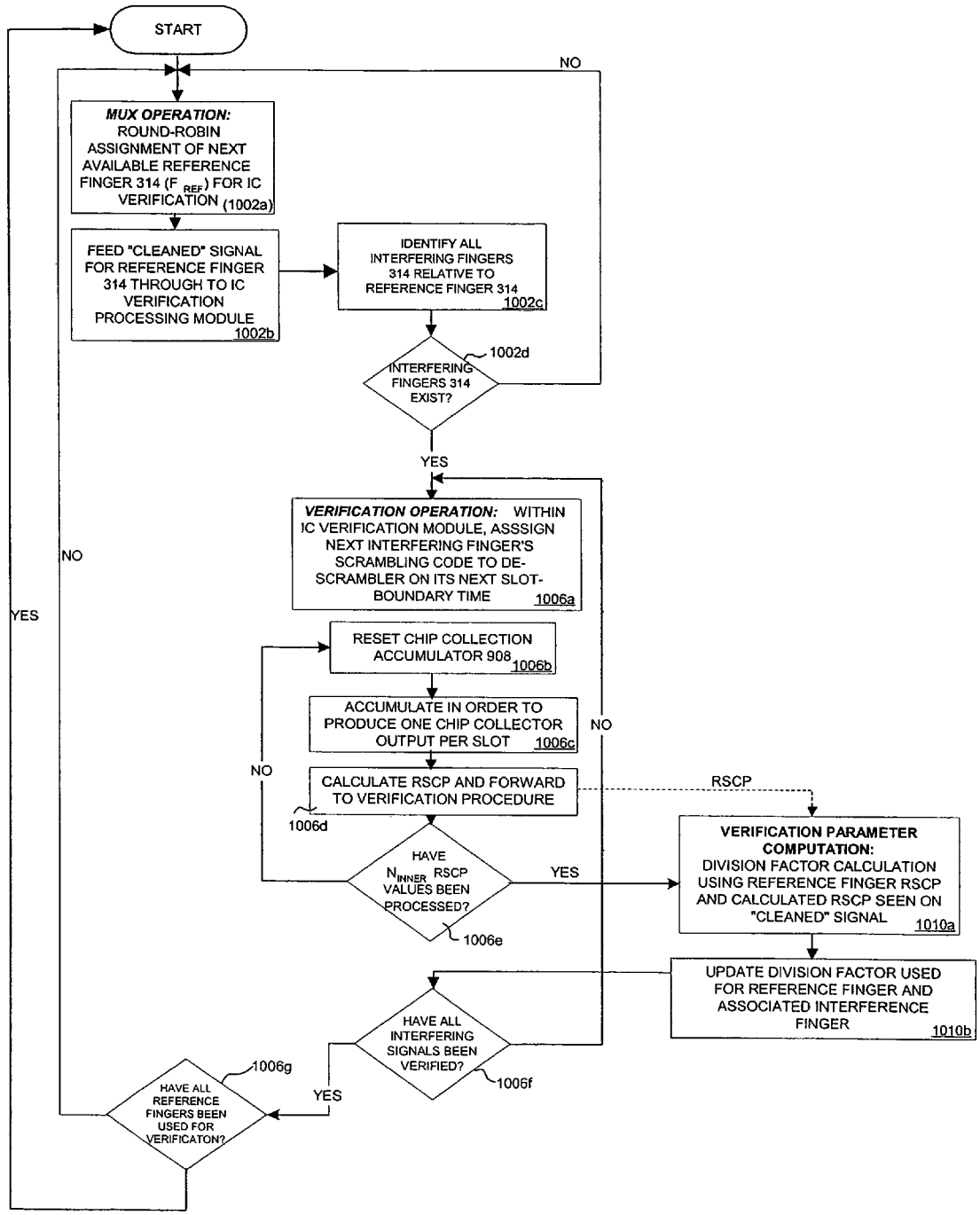
FIG. 10 is a flowchart representative of an interference cancellation verification process in accordance with one aspect of the invention.

FIG. 10 is a flowchart representative of an IC verification process in accordance with the invention. As shown in FIG. 10, a MUX operation involves assignment of the signals from each finger 314 on a round-robin basis to the P-CPICH1 verification sub-system 900 (steps 1002). In the exemplary embodiment a new reference finger 314 is assigned for verification once during every $N_{outer}$ time slots.

As shown, processing continues with a VERIFICATION operation in which all interfering signals with respect to the reference finger 314 are identified (step 1006). The VERIFICATION operation is carried out by the P-CPICH1 verification sub-system 900 with respect to all such interfering signals, which results in $N_{inner}$ RSCP values measured on "cleaned" reference signals. In the exemplary embodiment this identification takes place on the end-of-slot boundaries associated with the interference finger. Thus, once every $N_{inner}$ slots (plus-minus the relative finger timing offsets) the scrambling code associated with the interfering finger 314 is assigned to the descrambling module 904 of the P-CPICH1 verification sub-system 900 (step 1006*a*) and the chip accumulator 908 is reset (step 1006*b*). The chip accumulator 908 then collects chips produced by the descrambling module 904 in response to descrambling of the cleaned signal over a particular slot using the scrambling code of the selected interfering finger 314 (step 1006*c*). The RSCP corresponding to this slot is then calculated on the basis of the current contents of the chip accumulator 908 and utilized in a VERIFICATION PARAMETER COMPUTATION routine (described below) (step 1006*d*). If $N_{inner}$ RSCP values have not yet been produced, the chip accumulator 908 is reset (step 1006*b*) and steps 1006*c* and 1006*d* are repeated; otherwise, the verification procedure is commenced (step 1006*e*).

Again referring to FIG. 10, the VERIFICATION PARAMETER COMPUTATION routine (steps 1010) is employed to compute various parameters utilized during execution of the VERIFICATION operation (steps 1006). In a step 1010*a*, a division factor associated with each specific finger 314 is calculated by comparing the RSCP content of the applicable P-CPICH1 signal before and after interference cancellation. For example, consider the case in which the VERIFICATION operation pertains to determining the extent to which the pilot energy of a second finger processor 314 ("finger #2") is seen by a first finger processor ("finger #1). In this situation the intra-finger IC signal 440 produced by finger #2 would be compared with the output of the verification sub-system 900. If the latter is smaller than the intra-finger IC signal 440 of finger #2, then the division factor is changed to increase the size of the inter-finger IC signal 520 subtracted from the received signal applied to finger #1. Each newly-computed division factor is stored within the verification sub-system 900 and utilized in subsequent verification operations before again being updated (step 1010*b*).

The VERIFICATION operation is continued by determining whether steps 1006*a-e* have been performed with respect to each of the finger signals interfering with the finger 314 currently selected for verification (step 1006*f*). If not, steps 1006*a-d* are performed with respect to the next interfering finger signal identified pursuant to step 1002*c*; otherwise, it is determined whether the VERIFICATION operation has been carried out with respect to each finger 314 (step 1006*g*).

A number of embodiments of the present invention have been described. Nevertheless, it will be understood that various modifications may be made without departing from the scope of the invention. For example, the methods of the present invention can be executed in software or hardware, or a combination of hardware and software embodiments. As another example, it should be understood that the functions described as being part of one module may in general be performed equivalently in another module. As yet another example, steps or acts shown or described in a particular sequence may generally be performed in a different order. Moreover, the numerical values for the operational and implementation parameters set forth herein are merely exemplary, and other embodiments and implementations may differ without departing from the scope of the invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following claims and their equivalents define the scope of the invention.

What is claimed is:

1. A rake receiver circuit, comprising:
    finger processors that process digital signals, each finger processor comprising an intra-finger interference canceller that generates a respective intra-finger interference cancellation signal; and
    an inter-finger interference canceller that generates inter-finger interference cancellation signals based on weighted subsets of intra-finger interference cancellation signals, the inter-finger interference cancellation signals being used by the finger processors to reduce inter-finger interference in the digital signals, the inter-finger interference canceller comprising a verification circuit,
    wherein the verification circuit determines interference levels remaining within interference-reduced digital signals.

2. The rake receiver circuit according to claim 1,
    wherein the digital signals comprise pilot signals associated with corresponding finger processors, and
    wherein the verification circuit identifies ones of the pilot signals that interfere with reception of the digital signals within ones of the finger processors.

3. The rake receiver circuit according to claim 1,
    wherein the finger processors comprise N finger processors,
    wherein N is an integer, and
    wherein at least one subset comprises N-1 weighted intra-finger interference cancellation signals.

4. The rake receiver circuit according to claim 1,
    wherein each finger processor receives a respective inter-finger interference cancellation signal based on a different subset of the intra-finger interference cancellation signals.

5. The rake receiver circuit according to claim 1, wherein each finger processor subtracts a received inter-finger interference cancellation signal from a received digital signal.

6. The rake receiver circuit according to claim 1, wherein each finger processor creates one or more pilot channel models of one or more pilot channels that are associated with the respective finger processor.

7. The rake receiver circuit according to claim 6, wherein the one or more pilot channel models comprise a primary pilot channel model and a secondary pilot channel model.

8. The rake receiver circuit according to claim 6, wherein the one or more pilot channel models comprise first and second primary pilot channel models and first and second secondary pilot channel models.

9. The rake receiver circuit according to claim 1, wherein a particular finger processor of the finger processors generates the respective intra-finger interference cancellation signal based on one or more pilot channel models generated by the particular finger processor.

10. The rake receiver circuit according to claim 1, wherein each of the intra-finger interference cancellation signals is generated based on one or more of the interference-reduced digital signals.

11. The rake receiver circuit according to claim 1,
    wherein the inter-finger interference canceller further comprises a gain adjuster,
    wherein the gain adjuster weights the intra-finger interference cancellation signals.

12. The rake receiver circuit according to claim 11,
    wherein the inter-finger interference canceller further comprises a combiner,
    wherein the combiner combines ones of the weighted intra-finger interference cancellation signals.

13. A rake receiver circuit, comprising:
    finger processors that process digital signals, each finger processor comprising an intra-finger interference canceller that generates a respective intra-finger interference cancellation signal; and
    an inter-finger interference canceller that generates inter-finger interference cancellation signals based on weighted subsets of intra-finger interference cancellation signals, the inter-finger interference cancellation signals being used by the finger processors to reduce inter-finger interference in the digital signals, the inter-finger interference canceller comprising a verification circuit,
    wherein the digital signals comprise pilot signals associated with corresponding finger processors, and
    wherein the verification circuit identifies ones of the pilot signals that interfere with reception of the digital signals within ones of the finger processors.

14. The rake receiver circuit according to claim 13,
    wherein the finger processors comprise N finger processors,
    wherein N is an integer, and
    wherein at least one subset comprises N-1 weighted intra-finger interference cancellation signals.

15. The rake receiver circuit according to claim 13,
    wherein each finger processor receives a respective inter-finger interference cancellation signal based on a different subset of the intra-finger interference cancellation signals.

16. The rake receiver circuit according to claim 13, wherein each finger processor subtracts a received inter-finger interference cancellation signal from a received digital signal.

17. The rake receiver circuit according to claim 13, wherein each finger processor creates one or more pilot channel models of one or more of pilot channels that are associated with the respective finger processor.

18. The rake receiver circuit according to claim 17, wherein the one or more pilot channel models comprise a primary pilot channel model and a secondary pilot channel model.

19. The rake receiver circuit according to claim 17, wherein the one or more pilot channel models comprise first and second primary pilot channel models and first and second secondary pilot channel models.

20. The rake receiver circuit according to claim 13, wherein a particular finger processor of the finger processors generates the respective intra-finger interference cancellation signal based on one or more pilot channel models generated by the particular finger processor.

21. The rake receiver circuit according to claim 13, wherein each of the intra-finger interference cancellation signals is generated based on one or more of the interference-reduced digital signals.

22. The rake receiver circuit according to claim 13, wherein the inter-finger interference canceller further comprises a gain adjuster, wherein the gain adjuster weights the intra-finger interference cancellation signals.

23. The rake receiver circuit according to claim 13, wherein the inter-finger interference canceller further comprises a combiner, wherein the combiner combines ones of the weighted intra-finger interference cancellation signals.

* * * * *